United States Patent [19]

Somsel

[11] Patent Number: 5,764,333
[45] Date of Patent: Jun. 9, 1998

[54] SUNSHIELDS FOR EYEGLASSES

[76] Inventor: John R. Somsel, 119 Stoneway Trail, Madison, Ala. 35758

[21] Appl. No.: 808,504

[22] Filed: Feb. 27, 1997

[51] Int. Cl.$^6$ ............................... G02C 9/00; G02C 7/10; G02C 13/00
[52] U.S. Cl. ............... 351/47; 351/44; 351/158; 351/178
[58] Field of Search ............... 351/41, 44, 47, 351/158, 178

[56] References Cited

U.S. PATENT DOCUMENTS

| | | |
|---|---|---|
| 1,130,634 | 3/1915 | Rooney . |
| 2,759,394 | 8/1956 | Evans . |
| 3,628,854 | 12/1971 | Jampolsky . |
| 5,416,537 | 5/1995 | Sadler . |
| 5,502,516 | 3/1996 | Elterman . |
| 5,617,153 | 4/1997 | Allen et al. ............... 351/47 |

FOREIGN PATENT DOCUMENTS

| | | |
|---|---|---|
| 2682197 | 4/1993 | France . |
| 5-34648 | 2/1993 | Japan . |
| 1052908 | 12/1966 | United Kingdom . |

*Primary Examiner*—Huy Mai
*Attorney, Agent, or Firm*—Richard C. Litman

[57] ABSTRACT

A method and kit for making sunshields for eyeglasses. The sunshields are flexible, transparent sheets of smooth plastic film that are retained on lenses of eyeglasses by electrostatic attraction. The sunshields are made of smooth plastic film having opposed parallel surfaces that are flat and planar except as the film may be curved to match surfaces of the lenses, and absorb some incident electromagnetic radiation. The method includes the steps of laying eyeglasses on a sheet of writing material and tracing an outline of lenses of the eyeglasses on the sheet with a writing implement, cutting along the outlines on the sheet to obtain silhouettes of the lenses, comparing the silhouettes to the lenses in the eyeglasses to see if they match, and laying the silhouettes on a sheet of the smooth plastic film, and cutting the plastic film along the edges of the silhouettes. Also included in the invention is a carrying case for the sunshields, having a material on its interior surface which can impart an electrostatic charge to the sunshields.

12 Claims, 5 Drawing Sheets

SUNSHIELDS FOR EYEGLASSES

CROSS-REFERENCE TO RELATED APPLICATION

This application claims the benefit of U.S. Provisional patent application Ser. No. 60/016,699, filed May 2, 1996.

BACKGROUND OF THE INVENTION

1. Field of the Invention

The present invention relates to a method of making sunshields for eyeglasses from thin plastic sheets, and a kit including a specialized container for the resulting sunshields.

2. Description of the Prior Art

In contrast to the prior art described below, the present invention is a method of making sunshields for eyeglasses from thin plastic sheets, and a kit including a specialized container for the resulting sunshields. The sunshields are retained on the outer surfaces of the lenses of eyeglasses by electrostatic attraction to convert ordinary eyeglasses into sunglasses suitable for people who must wear prescription eyeglasses, without the expense of buying a separate pair of prescription sunglasses, and without the nuisance and unsightly appearance of clip-on sunglasses.

The prior art discloses a variety of sunshades for eyeglasses.

U.S. Pat. No. 1,130,634, issued on Mar. 2, 1915, to Martin J. Rooney, discloses a lens shade for eyeglasses which is attached to the eyeglasses by mechanical means, rather than by electrostatic attraction as in the instant invention. U.S. Pat. No. 2,759,394, issued on Aug. 21, 1956, to David L. Evans, discloses a glare shield for eyeglasses that is attached to the lenses of the eyeglasses by an adhesive between the edges of the shields and the lenses.

U.S. Pat. No. 3,628,854, issued on Dec. 21, 1971, to Arthur Jampolsky, discloses a flexible Fresnal refracting membrane adhered to ophthalmic lenses by molecular surface adhesion. The instant invention is distinguishable in that the plastic film has a smooth surface rather than being a refracting membrane with ridges.

U.S. Pat. No. 5,416,537, issued on May 16, 1995, to Frank Sadler, discloses a magnetic means for securing auxiliary lenses to eyeglasses, which does not involve electrostatic attraction. U.S. Pat. No. 5,502,516, issued on Mar. 26, 1996, to Warren B. Elterman, discloses a disposable/reusable sun filter for eyeglasses, which is attached by mechanical means and/or an adhesive, rather than by electrostatic attraction.

British Patent No. 1,052,908, complete specification published on Dec. 30, 1966, to Jacques Party and Michel Meillet, discloses slip-on auxiliary glasses, which are attached to ordinary eyeglasses by mechanical means, rather than by electrostatic attraction. French Patent No. 2 682 197, published Apr. 9, 1993, to Jean Louis Guillaume, discloses a sun shade that is clipped onto ordinary eyeglasses.

Most notably, Japanese Patent No. 5-34648, dated Feb. 12, 1993, discloses a guard for spectacle lenses, which in one embodiment is a film retained on a lens electrostatically. It is distinguishable from the instant invention in that it does not include its method for making the sunshields, nor does it include the container of the instant invention.

None of the above inventions and patents, taken either singly or in combination, is seen to describe the instant invention as claimed.

SUMMARY OF THE INVENTION

The present invention is a method of making a pair of sunshields for eyeglasses from plastic film and a kit for creating the resulting lenses. The sunshields adhere to the lenses of the eyeglasses by electrostatic attraction or "static cling". The method of making the sunshields includes the steps of laying eyeglasses on a sheet of writing material such as paper and tracing an outline of lenses of the eyeglasses on the sheet with a writing implement, cutting along the outlines on the sheet to obtain silhouettes of the lenses, comparing the silhouettes to the lenses in the eyeglasses, and laying the silhouettes on a sheet of the smooth plastic film, and cutting the plastic film along the edges of the silhouettes.

A specialized carrying case is provided includes a material such as wool against which the sunshields can be rubbed to increase their electric charge. The carrying case and plastic film may be combined as a kit. Optionally, the template material and cutting implements may be included.

Accordingly, it is a principal object of the invention to provide a convenient and economical way of making sunshields for converting ordinary eyeglasses into sunglasses.

It is another object of the invention to provide a method of making sunshields that convert clear prescription eyeglasses into the functional equivalent of prescription sunglasses, which also resemble prescription sunglasses in appearance.

It is a further object of the invention to provide a convenient and economical method of making sunshields having a variety of tints or other shielding characteristics that can be applied to a single pair of eyeglasses.

Still another object of the invention is to provide a convenient means for carrying said sunshields and protecting them from damage when they are not in use, as well as a means for imparting electrostatic charge to the sunshields to insure that they will adhere to the lenses of the eyeglasses.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a method of making sunshields of plastic film that adhere to the surfaces of the lenses of eyeglasses by electrostatic attraction, and a kit including the resultant lenses in a specialized container for the sunshields.

Figure 1:
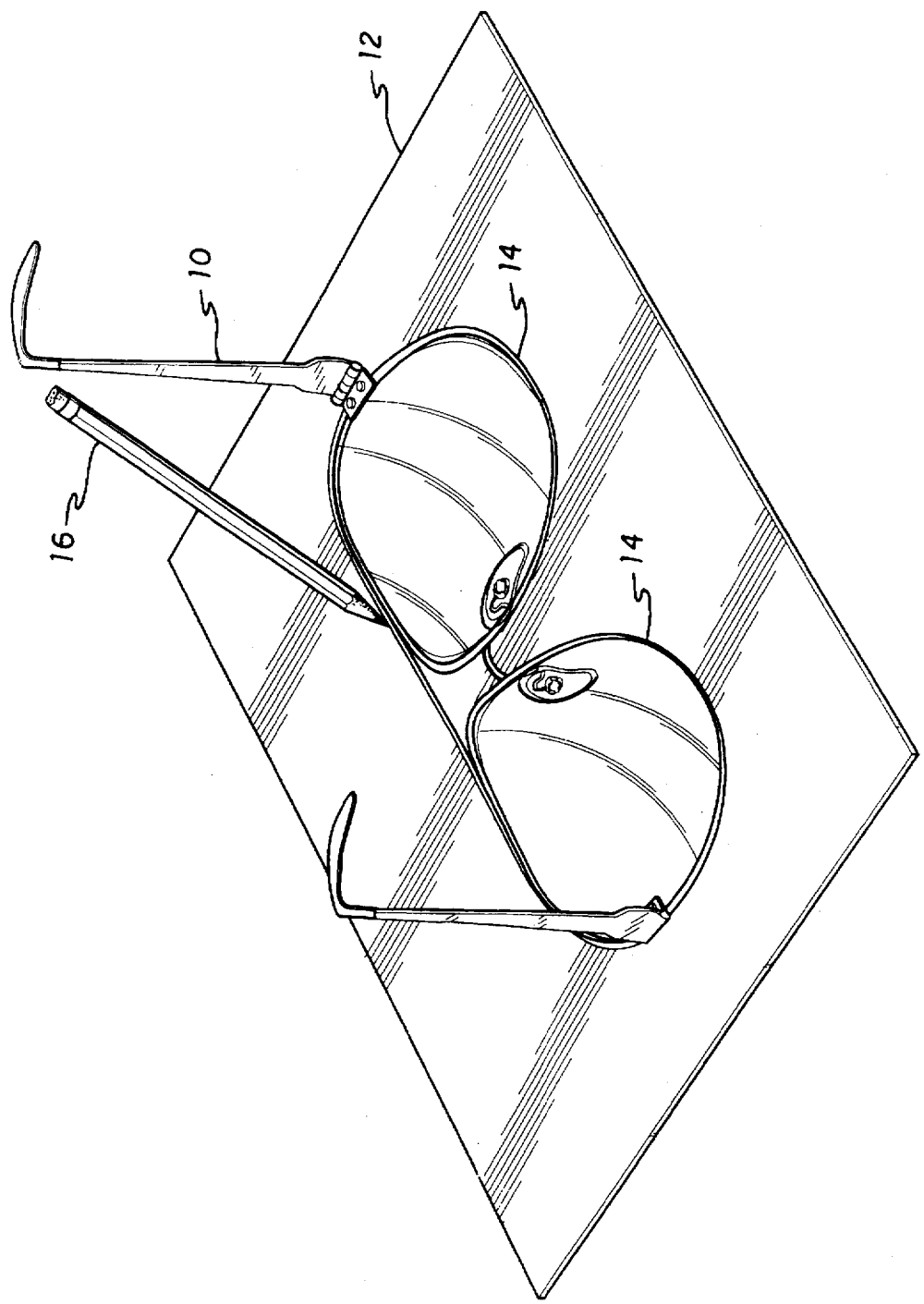
FIG. 1 is a perspective view diagrammatically showing the first step in making the sunshields.

FIG. 1 is a perspective view diagrammatically representing the first step in making the sunshields: laying a pair of eyeglasses 10 on a sheet of paper or other writing material 12 and tracing an outline of the lenses 14 of the eyeglasses on the sheet with a pen, pencil or other writing implement 16. In this manner, a template is formed closely approximating the exact shape of the lenses of the pair of eyeglasses to be covered.

Figure 2:
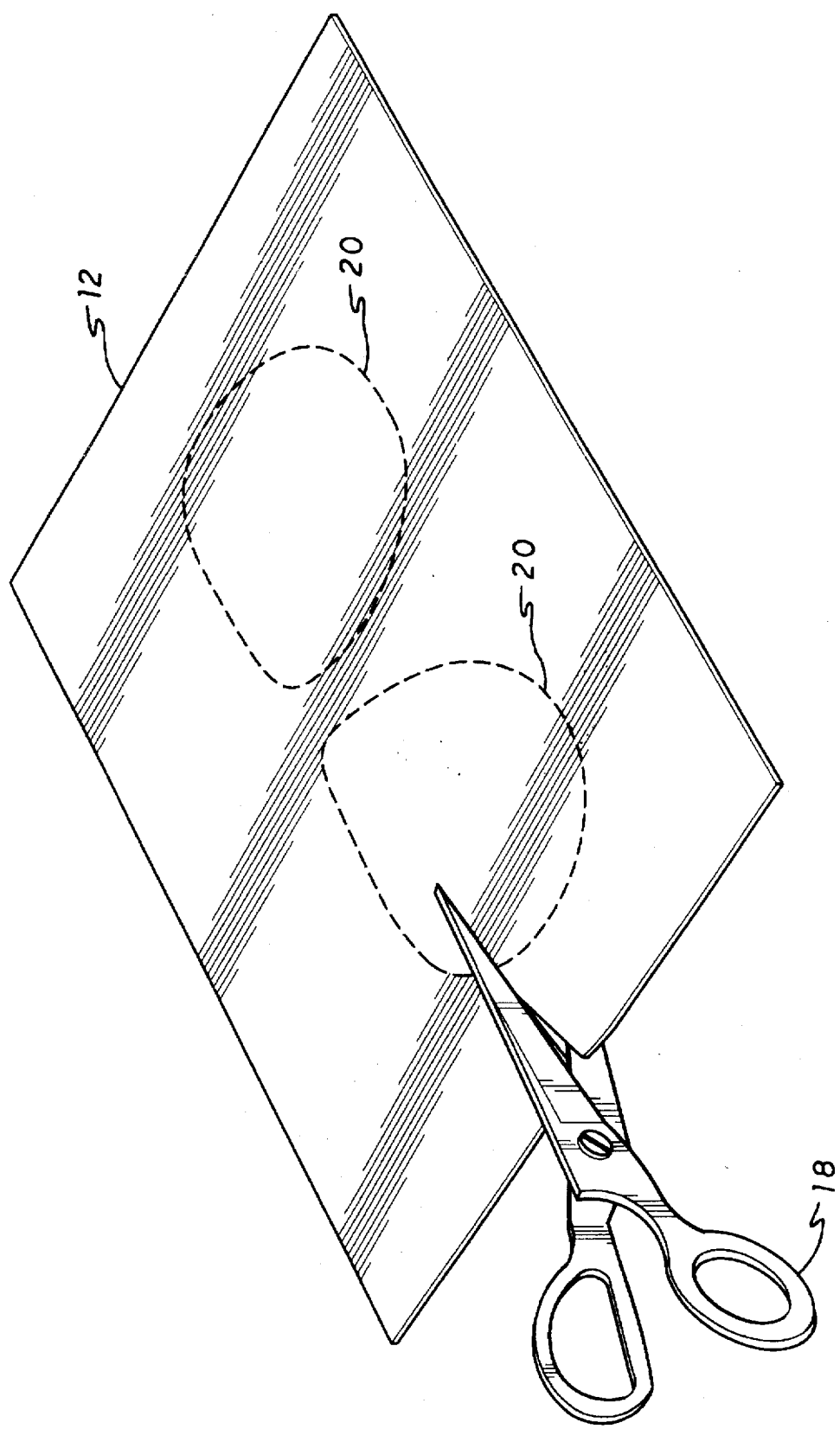
FIG. 2 is a perspective view diagrammatically showing the second step in making the sunshields.

FIG. 2 is a perspective view showing the second step in making the sunshields: using a pair of scissors or other cutting implement 18 to cut along the outlines 20 on the sheet 12 to obtain silhouettes of the lenses. Not shown in the drawings is the third step: comparing the silhouettes to the lenses in the eyeglasses to see if the shape closely matches, returning to step 1 for any silhouette that does not match to more closely delineate the shape, and otherwise proceeding to the fourth step.

Figure 3:
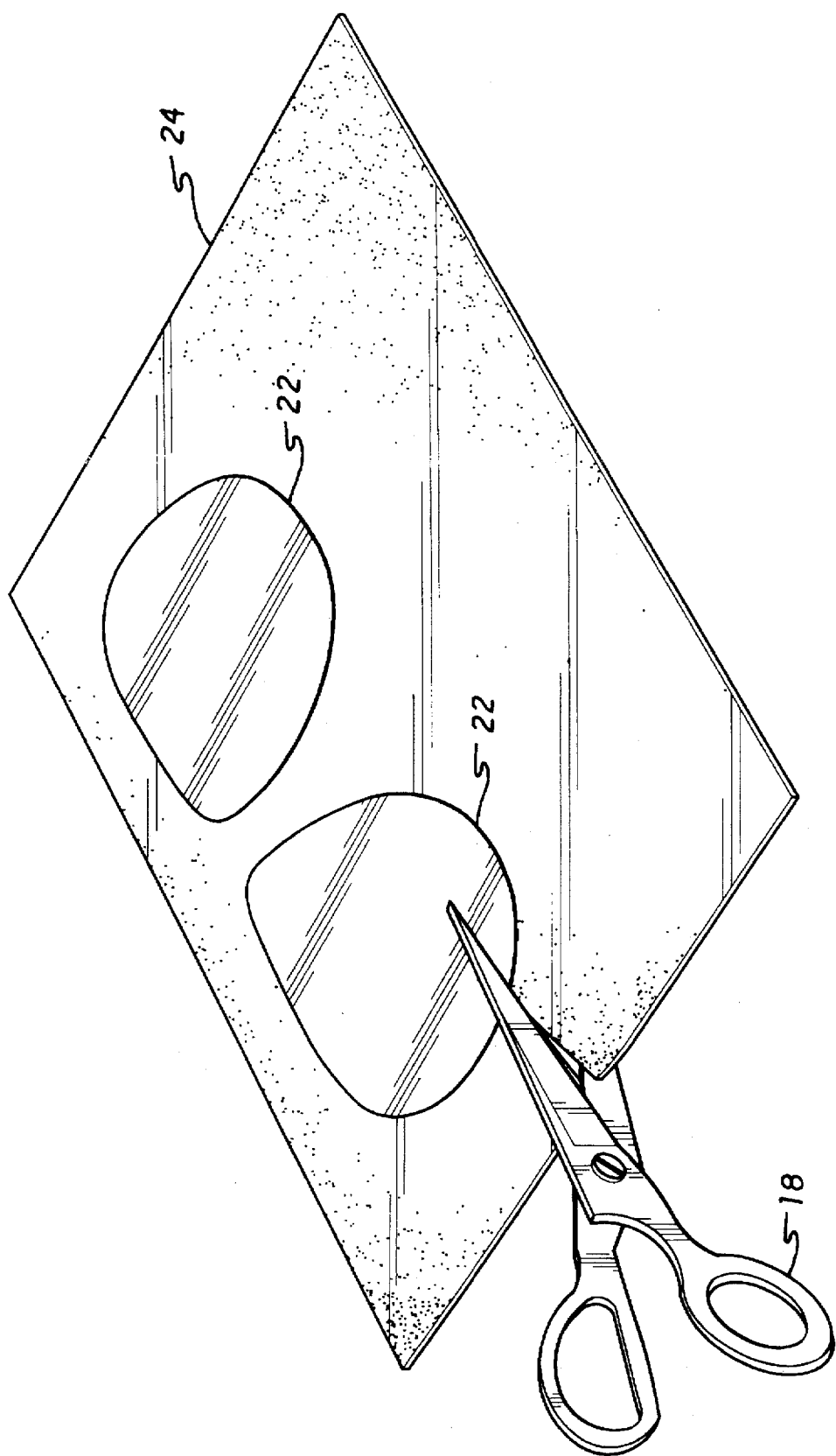
FIG. 3 is a perspective view diagrammatically showing the last step in making the sunshields.

FIG. 3 is a perspective view showing the fourth and last step in making the sunshields: laying the correctly sized and shaped silhouettes 22 on a sheet of the smooth plastic film 24, and cutting the plastic film along the edges of the silhouettes to form the sunshields. As described in more detail below, the plastic film has opposing flat and planar surfaces, without refraction ridges, and is preferably tinted dark.

Figure 4:
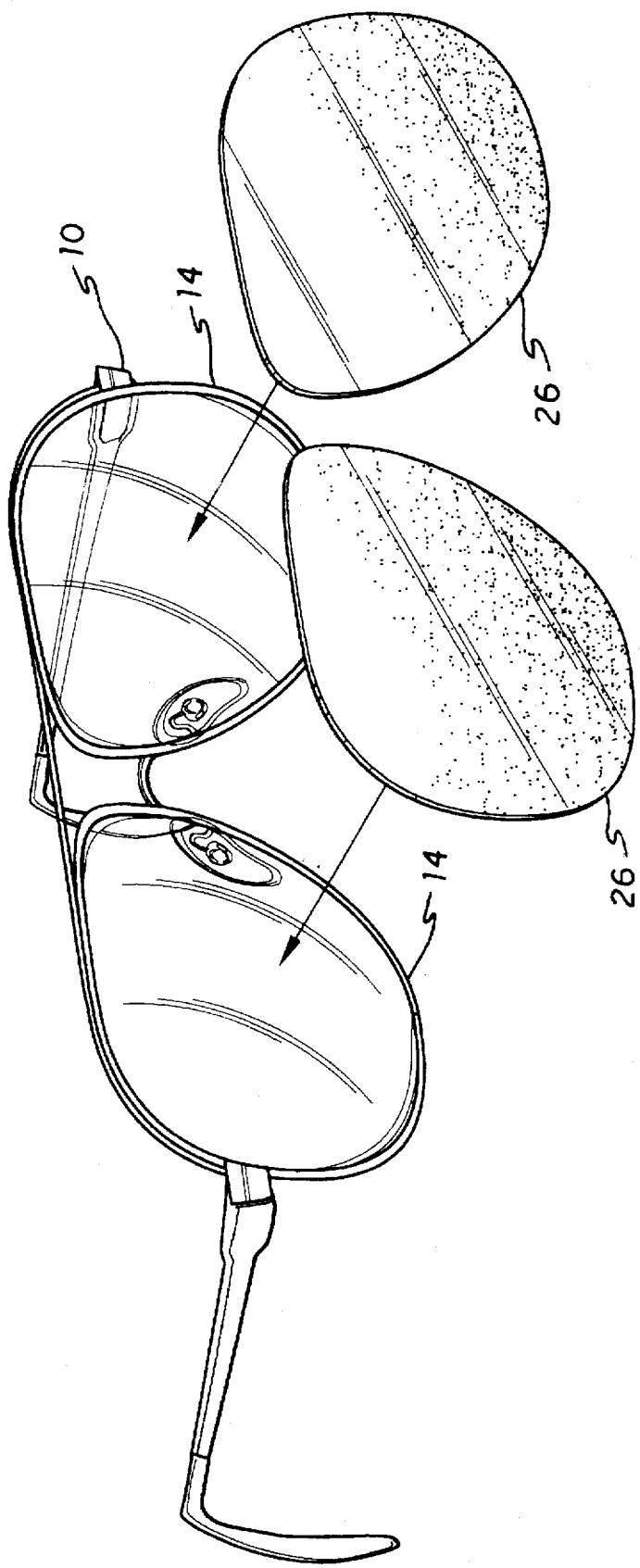
FIG. 4 is a perspective view diagrammatically showing the use of the sunshields on eyeglasses.

FIG. 4 is a perspective view showing the use of the sunshields 26 on the lenses 14 of the eyeglasses 10. The user places the sunshield on the lenses, perhaps applying slight pressure, and the electrostatic attraction between the sunshields and the glass or plastic in the lenses of the eyeglasses causes them to remain in place. When in use, the sunshields, though cut from a flat sheet, may be physically curved or slightly stretched due to the pliant characteristics of the sheet material to match the surface of the lenses. Preferably, the sunshields are attached to the outside surface of the lenses (away from the user), rather than the inside surface of the lenses (toward the user).

The plastic film must be flexible and transparent, and capable of adhering to the glass or plastic in the lenses of the eyeglasses solely by electrostatic attraction, without the aid of chemical adhesives or mechanical support. It may be composed of any one or more of a wide variety of materials, including, but not limited to, polyethylene, polystyrene, Mylar$_{TM}$, or other polymers. It may absorb some but not all of the incident visible light. It may also absorb incident ultraviolet light, or other electromagnetic radiation. A variety of different plastic films may be used to create sunshields that can provide protection in a variety of circumstances and weather conditions.

Figure 5:
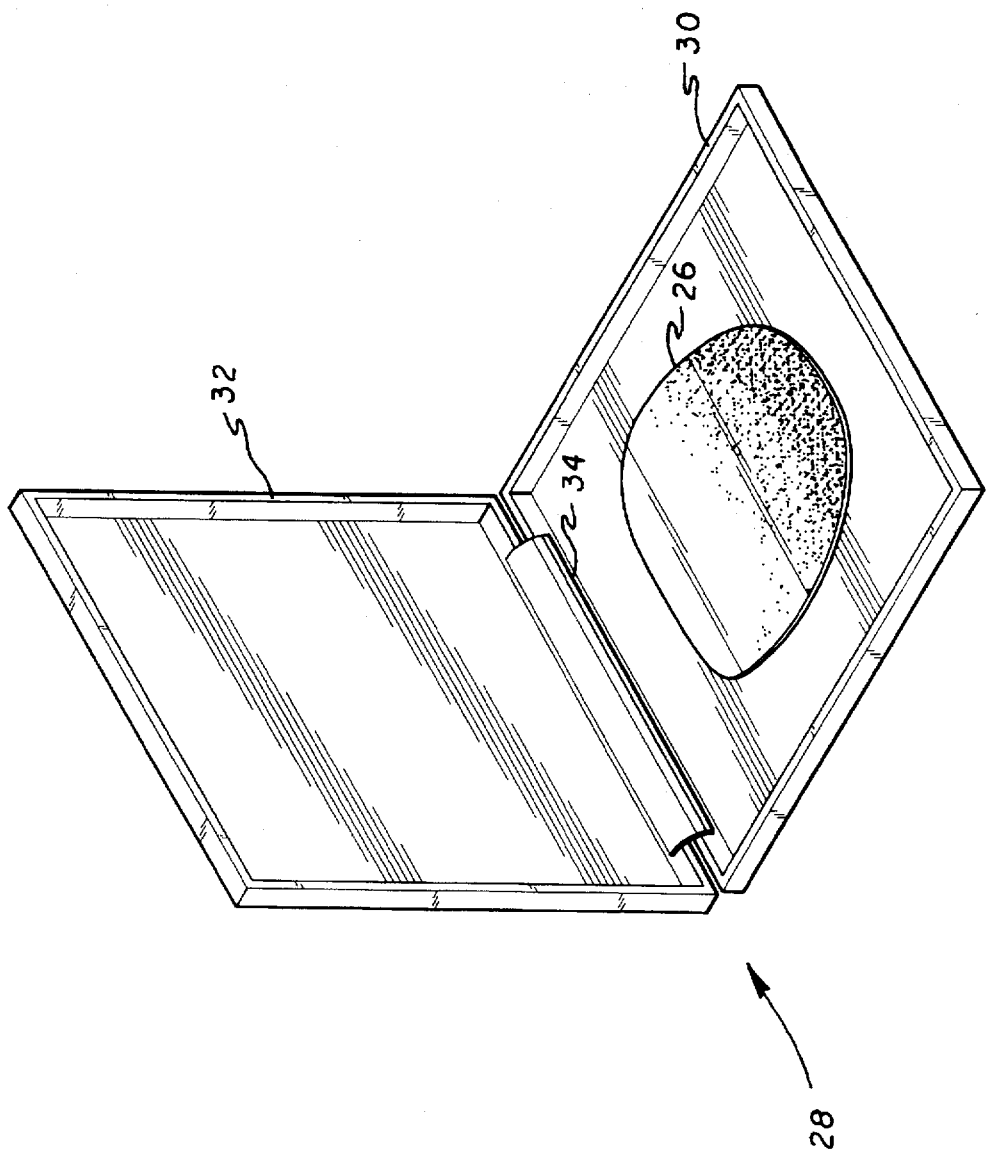
FIG. 5 is a perspective view diagrammatically showing storage of the sunshields.

FIG. 5 is a perspective view showing storage of the sunshields 26 in a carrying case 28 having a lower part 30, an upper part 32, and a flexible connecting member 34 by which the upper and lower parts are pivotally attached. The carrying case is shown in an open position; when it is in a closed position the sunshields are enclosed in an interior space formed by the joinder of the upper and lower parts, and thereby protected from damage. The inside surface of the upper and/or lower part may be covered with wool or another material that will impart electrostatic charge to the sunshields, when the user rubs the sunshields against it, to insure that they adhere to the surface of the lenses of the eyeglasses.

To complement such specialized container, a kit may be provided in which the user is provided the specialized container in combination with an oversized plastic film material suitable for use with the present method as described above. The plastic film may be provided as a rectangular sheet of standardized dimensions, suitable for cutting away one or more pairs of lens sunshields from the sheet. In addition, standard templates of common eyeglass lens sizes may be included, or a suitable template material, such as paper. The paper may include printed indicia including instructions and/or the template outlines. The kit may further include cutting or writing implements.

It is to be understood that the present invention is not limited to the sole embodiment described above, but encompasses any and all embodiments within the scope of the following claims.

I claim:

1. A method for making sunshields for eyeglasses, comprising the steps of:

laying eyeglasses on a sheet of writing material and tracing an outline of lenses of the eyeglasses on the sheet with a writing implement;

cutting along the outlines on the sheet to obtain silhouettes of the lenses;

comparing the silhouettes to the lenses in the eyeglasses; and laying the silhouettes on a flexible transparent sheet of smooth plastic film, and cutting the plastic film along the edges of the silhouettes, so as to form sunshields that are retained on lenses of eyeglasses by electrostatic attraction;

wherein said smooth plastic film has opposed parallel surfaces that are flat and planar except as the film may be curved to match surfaces of the lenses, and the film absorbs some but not all incident electromagnetic radiation.

2. The method of making sunshields for eyeglasses according to claim 1, wherein:

the sheets of smooth plastic film are dimensioned and configured to exactly match outside surfaces of the lenses of the eyeglasses.

3. The method of making sunshields for eyeglasses according to claim 1, wherein:

the smooth plastic film is selected from a material that absorbs some incident visible light.

4. The method of making sunshields for eyeglasses according to claim 1, wherein:

the smooth plastic film is selected from a material that absorbs incident ultraviolet radiation.

5. The method of making sunshields for eyeglasses according to claim 1, wherein:

the smooth plastic film is selected from a material that polarizes incident light.

6. The method of making sunshields for eyeglasses according to claim 1, wherein:

the smooth plastic film is made of polyethylene.

7. The method of making sunshields for eyeglasses according to claim 1, wherein:

the smooth plastic film is made of polystyrene.

8. The method of making sunshields for eyeglasses according to claim 1, wherein:

the smooth plastic film is made of a polyester.

9. A combination of sunshields for eyeglasses and a carrying case, comprising:

flexible transparent sheets of smooth plastic film that are retained on lenses of eyeglasses by electrostatic attraction, said smooth plastic film having opposed parallel surfaces that are flat and planar except as the film may be curved to match surfaces of the lenses, and said smooth plastic film absorbing some but not all incident electromagnetic radiation; and a carrying case with two pivotally attached parts, each part having an interior surface and an exterior surface, said parts being pivotally moveable between an open and a closed position, in the closed position having a closed interior space in which the sunshields may be protected from damage, and at least one of said parts having a material on its interior surface which can impart an electrostatic charge to the sunshields.

10. The combination according to claim 9, further comprising a cutting implement.

11. The combination according to claim 9, further comprising a marking implement.

12. The combination according to claim 9, further comprising a template sheet material.

* * * * *